(12) United States Patent
Matzdorf et al.

(10) Patent No.: US 6,663,700 B1
(45) Date of Patent: Dec. 16, 2003

(54) POST-TREATMENT FOR METAL COATED SUBSTRATES

(75) Inventors: Craig A. Matzdorf, California, MD (US); William C. Nickerson, Jr., Hughesville, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/351,751

(22) Filed: Jan. 23, 2003

Related U.S. Application Data

(63) Continuation-in-part of application No. 10/012,981, filed on Nov. 6, 2001, now Pat. No. 6,527,841, which is a continuation-in-part of application No. 09/702,225, filed on Oct. 31, 2000, now Pat. No. 6,375,726.

(51) Int. Cl.$^7$ ................................................ C23C 22/05
(52) U.S. Cl. ........................... 106/14.44; 106/14.21; 106/14.41; 148/247; 148/267; 148/275; 428/472; 428/472.1
(58) Field of Search ........................ 106/14.21, 14.41, 106/14.44; 148/247, 267, 275; 428/472, 472.1

(56) References Cited

U.S. PATENT DOCUMENTS

| | | | | | |
|---|---|---|---|---|---|
| 3,539,403 | A | * | 11/1970 | Ries ........................... | 148/273 |
| 3,912,548 | A | * | 10/1975 | Faigen ........................ | 428/472 |
| 3,986,970 | A | * | 10/1976 | Shiga ........................ | 252/79.3 |
| 4,148,670 | A | * | 4/1979 | Kelly ........................ | 148/247 |
| 4,273,592 | A | * | 6/1981 | Kelly ...................... | 428/472.2 |
| 4,339,310 | A | * | 7/1982 | Oda et al. .................... | 205/199 |
| 4,921,552 | A | * | 5/1990 | Sander et al. ............... | 148/247 |
| 4,963,198 | A | * | 10/1990 | Higgins ..................... | 148/267 |
| 5,091,023 | A | * | 2/1992 | Saeki et al. ................. | 148/247 |
| 5,226,976 | A | * | 7/1993 | Carlson et al. ............. | 148/257 |
| 5,304,257 | A | * | 4/1994 | Pearlstein et al. .......... | 148/265 |
| 5,395,655 | A | * | 3/1995 | Oyama Kazuyuki et al. ........ | 427/388.4 |
| 6,375,726 | B1 | * | 4/2002 | Matzdorf et al. ......... | 106/14.44 |
| 6,511,532 | B2 | * | 1/2003 | Matzdorf et al. ........ | 106/14.44 |
| 6,521,029 | B1 | * | 2/2003 | Matzdorf et al. ......... | 106/14.44 |
| 6,527,841 | B2 | * | 3/2003 | Matzdorf et al. ......... | 106/14.44 |

* cited by examiner

*Primary Examiner*—Anthony J. Green
(74) *Attorney, Agent, or Firm*—Ron Billi

(57) ABSTRACT

Aqueous compositions for post-treating metal coated substrates such as cadmium-plated steel, and zinc-nickel coated substrates and the process for using said compositions to provide a color recognizable coating and to improve the corrosion-resistance, abrasion, electrical, and adhesion properties of the coating. The post-treatment composition comprises an acidic aqueous solution having a pH ranging from about 2.5 to 5.5 and contains effective amounts of trivalent chromium compounds, alkali metal hexafluorozirconates, at least one divalent zinc compound, alkali metal fluoro-compounds, and effective amounts of water soluble thickeners, wetting agents or surfactants.

30 Claims, No Drawings

POST-TREATMENT FOR METAL COATED SUBSTRATES

CONTINUATION APPLICATION

This application is a continuation in-part of application Ser. No. 10/012,981 filed on Nov. 6, 2001, now U.S. Pat. No. 6,527,841 B2 issued Mar. 4, 2003 which in turn is a continuation-in-part of application Ser. No. 09/702,225 filed Oct. 31, 2000 by Matzdorf et al., now U.S. Pat. No. 6,375,726 B2 issued Apr. 23, 2002.

ORIGIN OF THE INVENTION

This invention described herein was made by an employee of the United States Government and may be manufactured and used by or for the Government for governmental purposes without the payment of any royalties thereon or therefor.

BACKGROUND OF THE INVENTION

Field of the Invention

This invention relates to a process of post-treating metal coated substrates, and to the composition for treating metal coated substrates to provide color recognition and improve adhesion-bonding, abrasion, and corrosion-resistant properties of the coated substrates. More specifically, this invention relates to a novel composition, and to the process of using the composition to post-treat metal coated substrates. The composition comprises an acidic aqueous solution comprising effective amounts of at least one water-soluble trivalent chromium compound, an alkali metal hexafluorozirconate, at least one tetrafluoroborate and/or hexafluorosilicate, at least one water soluble zinc compound and effective amounts of water-soluble thickeners.

DESCRIPTION OF PRIOR ART

Current high-performance post treatments for metal coated substrates are based on hexavalent chromium chemistry. Hexavalent chromium is highly toxic and a known carcinogen. As a result, the solutions used to deposit post-treatment coatings and the coating, per se are toxic. These coatings do, however, yield outstanding paint adhesion and corrosion resistance to the base metal. Typically, post-treatments or coatings are deposited onto the metal at ambient temperatures and usually applied by immersion or spray processes. Post treatments are usually specified by the military or commercial specifications that govern each metal coating being treated. As such, there is not a unique "post treatment" specification for all metal coatings as there is for "conversion coated" aluminum and its alloys.

Further, environmental laws, executive orders, and local occupational, safety, and health (OSH) regulations are driving military and commercial users in the search for chromate-free post treatments. In the case of these coated metals, the metal substrates and the coatings per se are relatively non-toxic. With the addition of a chromate post treatment, however, these coatings become toxic. In addition, the use of chromate post treatments is becoming more expensive as regulations tighten and costs are becoming prohibitive with restrictions imposed by the EPA. Moreover, certain processes like spraying chromate coating solutions are forbidden at some facilities due to OSH risk, thereby forcing the use of less-than-optimum solutions. Thus, while existing chromate post treatments are outstanding in their technical performance in that they provide enhanced corrosion protection and adhesion bonding e.g. adhesion for paint and other coatings at a low application cost, from a life-cycle cost, environmental, and OSH perspective, chromate coatings are detrimental for people and the environment.

SUMMARY OF THE INVENTION

This invention relates to trivalent chromium post treatment (TCP) compositions and to the processes for providing color recognition and improved adhesion and corrosion resistant properties of metal coated substrates. These coatings and processes are generally known as "post-treatments". Post-treatments are coatings in contact with the metal being treated after formation of the initial coating and therefore the post-treatments normally have no direct contact with the underlying substrate, except possibly through some pores in the outer metal coating.

Specifically, this invention relates to a composition and to the process of using said composition to post-treat metal coated substrates at ambient temperatures or higher e.g. temperatures ranging up to about 200° F. More specifically, this invention relates to compositions for post-treating metal coatings to provide color recognition, and to improve the corrosion-resistance, and adhesion bonding properties e.g. paint adhesion of the coatings. The composition comprises an acidic aqueous solution having a pH ranging from about 2.5 to 5.5 and preferably 3.7 to 4.0, and comprises, per liter of said solution, from about 0.01 to 22 grams of a water-soluble trivalent chromium compound, about 0.01 to 12 grams of an alkali metal hexafluorozirconate, about 0.0 to 12 grams and preferably 0.01 to 1.2 and more preferably 0.12 to 0.24 grams of at least one fluoro-compound selected from the group consisting of an alkali metal tetrafluoroborate, an alkali metal hexafluorosilicate and various combinations thereof, from about 0.001 to 10 grams per liter of at least one zinc compound, preferably divalent zinc salts, from about 0.0 to 10 grams per liter, preferably 0.5 to 1.5 grams of at least one water-soluble thickener and about 0.0 to 10 grams and preferably 0.5 to 1.5 grams per liter of at least one surfactant or wetting agent.

Compositions and processes based on trivalent chromium offer excellent technical performance compared to standard chromate-based coatings. However, a shortcoming of these compositions is the lack of a significant color change in the as-deposited metal coating, especially when used as a post treatment for aluminum-based sacrificial coatings. Chromate-based coatings of this type typically have an iridescent gold to brown color that is easily identified by processors, quality control personnel and other users in the field. A gold color on aluminum coated components generally means that a chromate post treatment is present and the color is useful for this type of quality control irrespective of technical coating performance such as resistance to corrosion or paint adhesion. TCP coatings typically have a light bluish to purplish to tan color, depending on the process conditions, that is very difficult to see in mixed light such as inside a production facility, at a repair depot or manufacturing plant. TCP coatings on some surfaces such as Ion Vapor Deposited (IVD) Aluminum is virtually colorless. Another shortcoming of these coatings is the relative performance of the TCP coatings as post treatments. As previously disclosed, TCP coatings yield about the same corrosion resistance as chromate post treatments on a variety of sacrificial coatings like cadmium, IVD aluminum, and zinc alloys such as zinc-nickel and tin-zinc. However, it would be desirable to have post treatment coatings that perform better than the presently known chromate post treatments.

It is therefore an object of this invention to provide an acidic aqueous solution comprising effective amounts of a trivalent chromium compound, an alkali metal hexafluorozirconate, a tetrafluoroborate and/or hexafluorosilicate and a divalent zinc compound for post-treating metal coated substrates to provide color recognition and identification, and to improve the adhesion bonding and corrosion resistance properties.

It is another object of this invention to provide a stable acidic aqueous solution having a pH ranging from about 2.5 to 5.5 containing a trivalent chromium salt, a hexafluorozirconate and a divalent zinc salt for post-treating metal coatings.

It is a further object of this invention to provide a stable acidic aqueous solution containing trivalent chromium having a pH ranging from about 3.7 to 4.0 for treating metal coated substrates at about room temperature wherein said solution contains substantially no hexavalent chromium.

These and other objects of the invention will become apparent by a further and more detailed description of the invention.

DETAILED DESCRIPTION OF THE INVENTION

This invention relates to compositions and processes for preparing corrosion-resistant coatings on sacrificial coatings such as cadmium, zinc, IVD aluminum, Alumiplate, zinc-nickel and tin-zinc. The process comprises treating said metal coated substrates with an acidic aqueous solution containing a trivalent chromium salt basic, an alkali metal zirconate such as potassium hexafluorozirconate, a cellulose-based thickener and an alkali metal compound such as a potassium tetrafluoroborate or hexafluorosilicate stabilizer. The composition must also contain divalent zinc-based compounds to impart color change or color recognition to the as-produced coating. In most cases, the zinc-based compounds also increases the corrosion resistance imparted by the post-treatment coating to the sacrificial coatings. The amount of the zinc compound can be varied to adjust the amount of color that is imparted to the coating, from as little as 0.001 grams per liter up to 10 grams per liter e.g. 0.1 to 5.0 grams per liter.

After preparing the sacrificial coating by standard techniques, the composition of this invention can be used at room temperature and applied to the substrate via immersion, spray or wipe-on techniques similar to those used for conventional chromate post-treatments. Solution dwell time is 1 to 15 minutes. Dwell time can be increased to up to 30 minutes with increased corrosion resistance which may also decrease adhesion. A 10-minute dwell time yields an optimum film for color change, paint adhesion, and corrosion resistance. In this invention, the 1 to 15 minute dwell time yields appreciable color change to the as-deposited coating that ranges from light brown to dark bronze to gray-blue to bright cobalt blue depending on the composition of the sacrificial coating treated. In addition, the zinc compounds that yield color change in the as-deposited coating also improves the corrosion resistance over previously prepared TCP post treatments for sacrificial coatings. In some cases, for example on IVD aluminum, the corrosion resistance improvement approaches 100% over the standard chromate and TCP post-treatments.

Specifically, this invention relates an acidic aqueous solution having a pH ranging from about 2.5 to 5.5, and preferably from about 3.7 to 4.0 and to the use of said solution for post-treating metal coated substrates to provide color recognition and identification, and to improve the adhesive bonding, abrasion, and corrosion-resistance properties of the metal coatings. The compositions of this invention comprise, per liter of solution, from about 0.01 to 22 grams and preferably from about 0.01 to 10 grams e.g. 5 to 7 grams of at least one water soluble trivalent chromium compound e.g. trivalent chromium sulfate, about 0.01 to 12 grams and preferably about 0.01 to 8.0 grams e.g. 6 to 8 grams of at least one alkali metal hexafluorozirconate, about 0.0 to 12 grams and preferably from about 0.01 to 1.2 grams e.g. 0.12 to 0.24 grams of at least one alkali metal tetrafluoroborate and/or an alkali metal hexafluorosilicate and mixtures thereof at various ratio, from about 0.001 to 10 grams e.g. 0.1 to 5.0 grams of at least one divalent zinc compound e.g. zinc sulfate, an effective amount ranging from 0.0 to 10 grams e.g. from 0.5 to 1.5 grams of a water soluble thickener and from 0 to 10 grams of a water soluble surfactant.

In some processes, depending on the physical character of the metal coated substrate, the addition of a water soluble thickener to the solution aids in optimum film formation during spray and wipe-on applications by slowing down solution evaporation. This also mitigates the formation of powdery deposits that degrade paint adhesion. In addition, the use of thickeners aid in proper film formation during large area applications and mitigates the diluent effect of rinse water remaining on the substrate during processing from previous steps of the process. This feature yields films that have no streaks and are better in coloration and corrosion protection. The water soluble thickeners such as cellulose compounds are present in the solution in amounts ranging from about 0 to 10 grams per liter and preferably from 0.5 to 1.5 e.g. about 1.0 gram per liter of the aqueous solution. Depending on the character of the coated substrate, an effective but small amount of at least one water-soluble surfactant can be added to the acidic solution in amounts ranging from about 0 to 10 grams per liter and preferably from 0.5 to 1.5 grams e.g. 1.0 gram per liter of the acidic solution. These surfactants are known in the art of aqueous solutions and include organic compounds selected from the group consisting of non-ionic, cationic and anionic surfactants.

The chromium compound is added as a water-soluble trivalent chromium compound, preferably as a trivalent chromium salt. Although the resultant coating is rinsed with water, it is desirable to use chromium salts that provide anions not as corrosive as the chlorides. Preferably, these anions are selected from the group consisting of nitrates, sulphates, phosphates and acetates. Specifically, in formulating the acidic aqueous solutions of this invention, the chromium salt is added conveniently to the solution in its water soluble form wherein the valence of the chromium is plus 3. Some preferred chromium compounds are added to the solution in the form of $Cr_2(SO_4)_3$, $(NH_4)Cr(SO_4)_2$, $Cr(OH)SO_4$, $Cr_2O_3$, or $KCr(SO_4)_2$ including various mixtures of these compounds. The preferred trivalent chromium concentration is within the range of about 5 to 7 grams or 6.0 grams per liter of the aqueous solution. It has been found that particularly good results are obtained when the trivalent chromium compound is present in solution in this preferred range. The preferred alkali metal fluorozirconate addition to the solution ranges from about 0.01 to 8.0 grams or 6.0 to 8.0 grams per liter. The zinc compound is preferably a divalent zinc salt such as zinc sulfate. The post-treatment of the metal coating can be carried out at ambient temperatures including temperatures of the solution or at higher temperatures e.g. temperatures ranging up to about 200° F. Room temperature treatment is preferred in that this eliminates the necessity for heating equipment. The coating may be air dried by any of the methods known in the art, for example, oven drying, forced air drying, exposure to infra-red lamps, and the like.

There are key advantages in the use of the compositions and processes of this invention. One is the readily visible color change and recognition or identification imparted to the as-deposited coating compared to previously disclosed sacrificial coatings. TCP as previously disclosed causes a practical color change on zinc-nickel, but not on the other coatings such as IVD aluminum, Alumiplate, cadmium, zinc and tin-zinc.

The second advantage of the improvement is the increase in corrosion resistance for sacrificial coatings treated with the composition of this invention. Table C describes several examples of the corrosion performance of the disclosed invention and its relationship to sacrificial coatings treated with standard chromate post-treatments and previously disclosed versions of TCP post-treatments. As shown, the disclosed invention provides superior corrosion performance compared to no post-treatment to a previously disclosed TCP post-treatment and most importantly, to a standard chromate post-treatment. This is evident on four different types of IVD Aluminum coatings. The $Zinc^{2+}$ cation or divalent compound can be supplied by any chemical source that dissolves in water and is compatible with the other components in the composition. Salts that are preferred include zinc acetate, zinc telluride, zinc tetrafluoroborate, and zinc sulfate. The composition, though typically used at ambient conditions, may be used at elevated temperature to increase reaction rate.

The following Examples illustrate the aqueous solutions of this invention and the method of using the solutions in post-treating metal coated substrates.

EXAMPLE 1

(TCP5P)

An acidic aqueous solution having a pH ranging from about 3.45 to 4.0 for post-treating coated metal substrates to improve the corrosion-resistant and adhesion bonding properties comprising from about 3.0 grams of trivalent chromium sulfate basic per liter of solution, and about 4.0 grams of potassium hexafluorozirconate per liter of solution.

EXAMPLE 1A (TCP5B3)

About 0.12 grams of potassium tetrafluoroborate are added to the aqueous solution of Example 1.

EXAMPLE 1B (TCP5PZ2)

About 1.0 grams per liter of zinc sulfate is added to the acidic solution of Example 1.

EXAMPLE 1C (TCP5B3Z4)

Example 1A is modified by the addition of about 2 grams per liter of divalent zinc sulfate to the solution.

EXAMPLE 1D (TCP5PZ1)

Example 1 is modified by the addition of about 0.5 grams per liter of zinc II sulfate.

EXAMPLE 2

(NC-83075)

An acidic aqueous solution having a pH ranging from 3.7 to 4.0 for post-treating coated metal substrates to improve adhesion bonding and corrosion-resistant which comprises, per liter of solution, from about 0.01 to 22 grams of trivalent chromium sulfate, about 0.01 to 12 grams of potassium hexafluorozirconate, about 0.01 to 12 grams of potassium tetrafluoroborate and from about 0.5 to 1.5 grams of methylcellulose thickener.

EXAMPLE 3

(NC-83075)

An acidic aqueous solution having a pH ranging from 3.7 to 4.0 for post-treating coated metal substrates to improve adhesion bonding and corrosion-resistant which comprises, per liter of solution, from about 4.0 to 8.0 grams of trivalent potassium-chromium sulfate $(KCr(SO4)_2)$, about 6 to 10 grams of potassium hexafluorozirconate, about 0.01 to 12 grams of potassium hexafluorosilicate and from about 0.5 to 1.5 grams of methylcellulose thickener.

Tables AI and AII detail colormetric measurements of various coatings post-treated with the invention described herein compared to those previously disclosed. Table B describes representative compositions and the processes of this invention to deposit the desired coating.

TABLES AI AND AII

TCP5PZ1 (Example 1D) on IVD-Aluminum with 5 and 10 minutes immersion in solution.

| AI | | | |
|---|---|---|---|
| Immersion Time | L | a | b |
| 5.0 minutes | 66.4 | −2.6 | 2.5 |
| 10 minutes | 59.3 | −2.6 | 0.9 |

| AII TCP5P (Example 1) and TCP5PZ2 (Example 1B) on IVD-Aluminum | | | | |
|---|---|---|---|---|
| Compositions | Immersion Time | L | a | b |
| TCP5P | 5 minutes | 59.7 | −1.4 | 0.9 |
| TCP5PZ2 | 5 minutes | 50.1 | −2.9 | 1.6 |

In Tables AI and AII, L, is the grayscale, wherein L=100 is pure white, L=0 is pure black, and L=50 is gray. Where "a", is the red to green scale, wherein 0 is a neutral value, +50 is pure red, and −50 is pure green. Where "b", is the yellow to blue scale, where 0 is a neutral value, +50 is pure yellow, and −50 is pure blue. Combining the "a" and "b" values gives the desired color (For example: −b, +a is purplish, "b"=−50 and "a"=+50 is pure purple) and the L value shows the darkness of the panels.

TABLE B

Representative Compositions and Processes to Produce Color Change or recognition and identification.

| Name | Composition | Process | Comments | Documentation Comparison |
|---|---|---|---|---|
| TCP5P EXAMPLE 1 | 3 grams/liter chromium III sulfate basic and 4 grams/liter potassium hexafluorozirconate | 5 to 10 minute dwell of composition on aluminum surface at ambient conditions | Baseline composition and process that yields coating without practical color change | Examples 2 and 3 |
| TCP5B3 EXAMPLE 1A | TCP5P and 0.12 grams/liter potassium tetrafluoroborate | 5 to 10 minute dwell of composition on aluminum surface at ambient conditions | Stabilized composition and process that yields coating without practical color change | Examples 2 and 3 |
| TCP5PZ2 EXAMPLE 1B | TCP5P and 1.0 grams/liter zinc sulfate | 1 to 10 minute dwell of composition on aluminum surface at ambient conditions | Baseline composition and process that yields coating with practical color change | Invention |
| TCP5B3Z4 EXAMPLE 1C | TCP5B3 and 2.0 grams/liter zinc sulfate | 1 to 10 minute dwell of composition on aluminum surface at ambient conditions | Stabilized composition and process that yields coating with practical color change | Invention |

The term "practical color change" means a readily visible, recognizable color that does not have a detrimental effect on the corrosion performance of the coating. The term "chromium III sulfate basic" is defined in the Kirk-Othmer Encyclopedia of Chemical Knowledge: Volume 6, $3^{rd}$ edition (pps 95–96).

TABLE C

Ion Vapor Deposited Aluminum on 4130 Steel- The data shows Corrosion Performance of IVD Aluminum After Processing with Various Post Treatments (Hours to Red Rust while Exposed to ASTM B 117 Neutral Salt Fog)

| IVD Deposition Process | Glass Bead Peen | Post Treatment Coating | First Signs of Red Rust (hours) Note: onset of rust in time range listed | | | |
|---|---|---|---|---|---|---|
| | | | Coupon 1 | Coupon 2 | Coupon 3 | Coupon 4 |
| Conventional | Yes | None | 288–336 | 336–384 | 336–384 | 336–384 |
| " | No | None | 384–432 | 600–672 | 600–672 | 672–720 |
| " | Yes | Alodine 1200S | 432–552 | 672–720 | 840–888 | 888–936 |
| " | No | Alodine 1200S | 552–600 | 672–720 | 840–888 | 840–888 |
| " | Yes | TCP5P - 10 min Ex-1 | 552–600 | 552–600 | 768–840 | 1200–1248 |
| Conventional | No | TCP5P - 10 min | 768–840 | 888–936 | 936–1008 | 936–1008 |
| " | Yes | TCP5P - 5 min | 384–432 | 432–552 | 432–552 | 432–552 |
| " | Yes | TCP5PZ2 - 10 min EX-1B | 672–720 | 1056–1104 | 2016–2112 | 2184–2280 |
| Conventional | No | TCP5PZ2 - 10 min | 840–888 | 1440–1560 | 2016–2112 | 2280–2376 |
| Modified | Yes | None | 216–288 | 216–288 | 216–288 | 216–288 |
| " | No | None | 336–384 | 336–384 | 336–384 | 432–552 |
| " | Yes | Alodine 1200S | 384–432 | 432–552 | 552–600 | 600–672 |
| " | No | Alodine 1200S | 384–432 | 432–552 | 600–672 | 888–936 |
| " | Yes | TCP5P - 10 min | 264–336 | 384–432 | 432–552 | 672–720 |
| " | No | TCP5P - 10 min | 432–552 | 552–600 | 552–600 | 552–600 |
| " | Yes | TCP5P - 5 min | 264–336 | 336–384 | 336–384 | 336–384 |
| " | Yes | TCP5PZ2 - 10 min | 432–552 | 600–672 | 600–672 | 1056–1104 |
| " | No | TCP5PZ2 - 10 min | 720–768 | 720–768 | 888–936 | 840–888 |

Note: Alodine 1200S is a chromate conversion coating.

Based on the onset of red rust as set forth in Table C, TCP with the color change additive (zinc compound) surpassed all other coatings in performance, regardless of the IVD aluminum process or peening, in some cases by as much as 100 percent. Baseline TCP5P applied with a 10 minute immersion was about as good as the chromate post-treatment. The TCP5P applied for 5 minutes was better than no post-treatment, but not as good as the chromate or other TCP coatings. Table D details the average onset of corrosion for each TCP coating compared to the chromate control (Alodine 1200S).

TABLE D

Average Onset of Red Rust for Post Treatments on IVD Aluminum

| Coating | Post Treatment | Average Onset of Red Rust, hours | |
|---|---|---|---|
| | | Peened | Unpeened |
| Conventional IVD | None | 324 | 564 |
| | Alodine 1200S | 708 | 726 |
| | TCP5P 5 min immersion | 420 | NA |
| | TCP5P 10 min immersion | 768 | 882 |
| | TCPZ1 w/color change, 10 min immersion | 1482 | 1644 |
| Modified IVD | None | 216 | 360 |
| | Alodine 1200S | 492 | 576 |
| | TCP5P 5 min immersion | 318 | NA |
| | TCP5P 10 min immersion | 438 | 522 |
| | TCPZ1 w/color change, 10 min immersion | 672 | 792 |

For purposes of this invention, the water soluble surfactants can be added to the trivalent chromium solutions in amounts ranging from about 0 to 10 grams per liter and preferably 0.5 To about 1.5 grams per liter of the trivalent chromium solution. The surfactants are added to the aqueous solution to provide better wetting properties by lowering the surface tension thereby insuring complete coverage, and a more uniform film on the coated substrate. The surfactants include at least one water soluble compound selected from the group consisting of the non-ionic, anionic, and cationic surfactants. Some known water soluble surfactants include the monocarboxyl imidoazoline, alkyl sulfate sodium salts (DUPONOL®), tridecyloxy poly(alkyleneoxy ethanol), ethoxylated or propoxylated alkyl phenol (IGEPAL®), alkyl sulfoamides, alkaryl sulfonates, palmitic alkanol amides (CENTROL®), octylpheniyl polyethoxy ethanol (TRITON®), sorbitan monopalmitate (SPAN®), dodecylphenyl polyethylene glycol ether (e.g. TERGITROL®), alkyl pyrrolidone, polyalkoxylated fatty acid esters, alkylbenzene sulfonates and mixtures thereof Other known water soluble surfactants are disclosed by. "Surfactants and Detersive Systems", published by John Wiley & Sops in Kirk-Othmer's Encyclopedia of Chemical Technology, $3^{rd}$ Ed.

When large surfaces do not permit immersion or where vertical surfaces are to be sprayed, thickening agents are added to retain the aqueous solution on the surface for sufficient contact time. The thickeners employed are known inorganic and organic water soluble thickeners which can be added to the trivalent chromium solutions in effective amounts ranging from about 0 to 10 grams per liter and preferably 0.5 to 1.5 grams per liter of the acidic solution. Specific examples of the preferred thickeners include the cellulose compounds, e.g. hydroxypropyl cellulose (e.g. Klucel), ethyl cellulose, hydroxyethyl cellulose, hydroxymethyl cellulose, and methyl cellulose. Some of the water soluble inorganic thickeners include colloidal silica, clays such as bentonite, starches, gum arabic, tragacanth, agar and various combination thereof While this invention has been described by a number of specific examples, it is obvious that there are other variations and modifications which can be made without departing from the spirit and scope of the invention as particularly set forth in the appended claims.

The invention claimed:

1. A process for post-treating metal coated substrates to provide color recognition, and improve the corrosion-resistance, abrasion, and adhesion properties which comprises treating the metal coated substrates with an acidic aqueous solution having a pH ranging from about 2.5 to 5.5 comprising, per liter of said solution, from about 0.01 to 22 grams of a water soluble trivalent chromium compound, about 0.01 to 12 grams of an alkali metal hexafluorozirconate, about 0.0 to 12 grams of a least one fluoro-compound selected from the group consisting of alkali metal tetrafluoroborates, alkali metal hexafluorosilicates and mixtures thereof, from about 0.001 to 10 grams of a divalent zinc compound, from 0 to 10 grams of at least one water soluble thickener and from 0 to 10 grams of at least one water soluble surfactant.

2. The process of claim 1 wherein the pH of the aqueous solution ranges from about 3.7 to 4.0 and the temperature of the solution ranges from about room temperature to 200° F.

3. The process of claim 2 wherein the trivalent chromium compound ranges from about 0.01 to 10 grams, the hexafluorozirconate ranges from about 0.01 to 8.0 grams, and the tetrafluoroborate ranges from about 0.01 to 1.2 grams.

4. The process of claim 2 wherein the thickener is a cellulose compound ranging from about 0.5 to 1.5 grams.

5. The process of claim 1 wherein the zinc compound is divalent zinc sulfate.

6. A process for post-treating metal coated substrates to provide color recognition and improve the corrosion-resistance, abrasion, and adhesion properties which comprises treating the metal coated substrates with an aqueous solution having a pH ranging from about 2.5 to 5.5 and comprises, per liter of solution, from about 0.01 to 10 grams of a water soluble trivalent chromium salt, about 0.01 to 8.0 grams of an alkali metal hexafluorozirconate, about 0.001 to 10 grams of a divalent zinc compound and about 0.01 to 1.2 grams of at least one fluoro-compound selected from the group consisting of alkali metal tetrafluoroborates, hexafluorosilicates and mixtures thereof.

7. The process of claim 6 wherein the zinc compound is divalent zinc sulfate.

8. The process of claim 6 wherein about 0.5 to 1.5 grams of a cellulose thickener is added to the solution.

9. The process of claim 6 wherein the chromium salt is trivalent chromium sulfate basic and the divalent zinc compound is zinc acetate.

10. The process of claim 6 wherein the alkali metal hexafluorozirconate is potassium hexafluorozirconate.

11. The process of claim 6 wherein the metal coated substrate is a cadmium-plated steel.

12. The process of claim 6 wherein the metal coated substrate is a zinc-nickel alloy coated substrate.

13. Composition for post-treating metal coated substrates to provide color recognition, and improve the corrosion-resistance, abrasion, and adhesion properties of the coating which comprises an acidic aqueous solution having a pH ranging from about 2.5 to 5.5, and contains per liter of said solution, from about 0.01 to 22 grams of a water-soluble trivalent chromium compound, about 0.01 to 12 grams of an alkali metal hexafluorozirconate, about 0.001 to 10 grams of a divalent zinc compound, about 0.0 to 12 grams of at least one fluoro-compound selected from the group consisting of an alkali metal tetrafluoroborate, an alkali metal hexafluorosilicate and mixtures thereof, and from 0 to 10 grams of at least one water soluble thickener.

14. The composition of claim 13 wherein the pH of the aqueous solution ranges from about 3.7 to 4.0.

15. The composition of claim 14 wherein the trivalent chromium compound ranges from about 0.01 to 10 grams, the hexafluorozirconate ranges from about 0.01 to 8.0 grams, and the tetrafluoroborate ranges from about 0.12 to 0.24 grams.

16. The composition of claim 15 wherein the thickener ranges from about 0.5 to 1.5 grams.

17. The composition of claim 16 wherein the zinc compound is divalent zinc sulfate and the chromium compound is trivalent chromium sulfate.

18. Composition for post treating metal coated substrates to provide color recognition, and improve the corrosion-resistance, abrasion, and adhesion bonding properties of the coating which comprises an acidic aqueous solution having a pH ranging from about 3.7 to 4.0, and contains per liter of said solution, water soluble compounds, ranging from about 0.01 to 10 grams of a trivalent chromium compound, about 0.01 to 8.0 grams of an alkali metal hexafluorozirconate, from about 0.01 to 5.0 grams of a divalent zinc salt, about 0.01 to 1.2 grams of at least one fluoro-compound selected from the group consisting of alkali metal tetrafluoroborates, alkali metal hexafluorosilicates and mixtures thereof, and from 0.5 to 1.5 grams of at least one water soluble thickener.

19. The composition of claim 18 wherein the tetrafluoroborate is present in the solution in an amount ranging from about 0.12 to 0.24 grams.

20. The composition of claim 19 wherein the zinc salt is divalent zinc sulfate.

21. The composition of claim 20 wherein the chromium compound is trivalent chromium sulfate basic.

22. The composition of claim 21 wherein the alkali metal hexafluorozirconate is potassium hexafluorozirconate.

23. Post-treated metal coated substrates having a color recognized coating and improved corrosion-resistance, electrical conductivity, abrasion, and adhesion properties which comprises said metal coated substrates treated with an acidic aqueous solution having a pH ranging from about 2.5 to 5.5 and comprising per liter of said solution from about 0.01 to 22 grams of a water-soluble trivalent chromium compound, from about 0.01 to 12 grams of an alkali metal hexafluorozirconate, about 0.0 to 12 grams of at least one fluoro-compound selected from the group consisting of an alkali metal tetrafluoroborate, an alkali metal hexafluorosilicate and mixtures thereof, about 0.001 to 10 grams of at least one water soluble zinc compound and from 0 to 10 grams of at least one water soluble thickener.

24. The post-treated metal coated substrates of claim 23 wherein the trivalent chromium compound ranges from about 0.01 to 10 grams, the hexafluorozirconate ranges from about 0.01 to 8.0 grams, and the tetrafluoroborate ranges from about 0.01 to 1.2 grams.

25. The post-treated metal coated substrates of claim 23 wherein the thickener ranges from about 0.5 to 1.5 grams.

26. The post-treated metal coated substrates of claim 23 wherein the zinc compound is divalent zinc acetate.

27. The post-treated metal coated substrates of claim 23 wherein the tetrafluoroborate is present in the solution in an amount ranging from about 0.12 to 0.24 grams.

28. The post-treated metal coated substrates of claim 23 wherein the chromium compound is trivalent chromium sulfate and the zinc compound is divalent zinc sulfate.

29. The post-treated metal coated substrates of claim 23 wherein the alkali metal hexafluorozirconate is potassium hexafluorozirconate.

30. The post-treated metal coated substrates of claim 23 wherein the zinc compound is divalent zinc sulfate and the pH of the acidic aqueous solution ranges from 3.7 to 4.0.

* * * * *